(12) United States Patent
Sprague (10) Patent No.: US 7,063,098 B2
(45) Date of Patent: Jun. 20, 2006

(54) FLUSH CARTRIDGE APPARATUS AND METHOD OF USE

(76) Inventor: Gerald L. Sprague, 7704 Diamond Trail, Lago Vista, TX (US) 78645

( * ) Notice: Subject to any disclaimer, the term of this patent is extended or adjusted under 35 U.S.C. 154(b) by 385 days.

(21) Appl. No.: 10/739,465

(22) Filed: Dec. 18, 2003

(65) Prior Publication Data

US 2004/0261849 A1    Dec. 30, 2004

Related U.S. Application Data

(60) Provisional application No. 60/480,859, filed on Jun. 24, 2003.

(51) Int. Cl.
*F16K 51/00*  (2006.01)
(52) U.S. Cl. ............... 137/15.04; 137/239; 137/454.6
(58) Field of Classification Search ............... 137/239, 137/238, 454.5, 454.6, 15.04, 15
See application file for complete search history.

(56) References Cited

U.S. PATENT DOCUMENTS

| | | | |
|---|---|---|---|
| 2,564,402 A | 8/1951 | MacArthur | |
| 4,063,317 A | 12/1977 | Santore | |
| 4,246,926 A | 1/1981 | Morello | |
| 4,393,891 A | 7/1983 | Snoek et al. | |
| 4,548,224 A * | 10/1985 | McLaughlin | ............... 137/238 |
| 4,790,356 A | 12/1988 | Tash | |
| 5,085,244 A | 2/1992 | Funk | |
| 5,467,796 A * | 11/1995 | Pettinaroli et al. | .......... 137/238 |
| 5,530,988 A | 7/1996 | McQuillan | |
| 5,588,459 A * | 12/1996 | Ellis | ........................... 137/239 |
| 6,123,094 A * | 9/2000 | Breda | ...................... 137/454.6 |
| 6,321,773 B1 | 11/2001 | Ramsby | |
| 6,761,184 B1 * | 7/2004 | Jordan | ........................ 137/238 |
| 6,907,623 B1 * | 6/2005 | Beh | ............................. 4/354 |
| 2004/0261864 A1 * | 12/2004 | Coll | ........................... 137/597 |

* cited by examiner

Primary Examiner—Kevin Lee
(74) Attorney, Agent, or Firm—David M. O'Brian (57)    ABSTRACT

Specifically, the present invention is a flush cartridge apparatus used in the controlled removal of accumulated debris from a water distribution system used within a residential and/or commercial structure. The flush cartridge apparatus is generally cylindrically shaped and is designed for sealed engagement within a plumbing valve housing, including pressure balance valves and mixing valves, to provide a long, sustained and complete flushing of water and debris from the water distribution system, while generally preventing water damage, and the occurrence of mold and/or mildew, within the structure. The flush cartridge apparatus can be used alone or in combination with other plumbing tools depending upon the specific need. The flush cartridge apparatus includes alignment and mating features for improved control and safety while using the apparatus.

20 Claims, 4 Drawing Sheets

FLUSH CARTRIDGE APPARATUS AND METHOD OF USE

Priority for this non-provisional patent application is claimed under 35 U.S.C. § 119, pursuant to Applicant's provisional patent application, application No. 60/480,859 filed on Jun. 24, 2003.

FIELD OF THE INVENTION

The present invention relates generally to plumbing tools, plumbing fittings and the like, used to remove debris from water distribution and piping systems. Specifically, the present invention relates to plumbing tools and plumbing fittings used to controllably remove debris from potable water plumbing pipe, plumbing valves, bath tub and shower water faucets and/or fixtures used in residential and commercial plumbing systems.

BACKGROUND OF THE INVENTION

In conventional plumbing systems used in residential and commercial structures, a potable water distribution system may be comprised of many lengths of plumbing pipe, pipe connections, numerous water faucets and/or fixtures, hot water heaters, water softeners, water filters and various other plumbing valves, meters, etc. During the installation and connection of residential and commercial plumbing pipe, often the ends of the pipe can be left open for considerable periods of time pending the completion of the water delivery system. While the ends of the pipe are left open, various kinds of debris can enter the pipe. Further, during the installation of the plumbing pipe, the pipe is typically shoved or pushed through drilled openings in wood boards, sheetrock, etc., wherein sawdust and sheetrock particles can enter the pipe ends. It is also very common to have residual solder and flux remain within the potable water lines, used in making the welds required to seal the pipes at each joint, coupling and bend. The installation of sprinkler and yard lines, water softeners, water purification systems, filters and other external apparatus also creates the potential for the entry of various kinds of debris into the potable water lines. Additionally, should there ever exist a temporary opening or unintended break (i.e., a burst, puncture or rupture) in these plumbing pipes, caused for example during freezing weather, repair of the pipe, the additional installation of other pipe or valves or during maintenance of the pipe, a variety of debris including solder, PVC glue, sand, silt, dirt, wood shavings, saw dust, copper shavings and other debris can enter the pipe opening. Even without the existence of a temporary or unintended opening in the plumbing pipe, inherent debris associated with potable water, such as sand, silt and rock particles, will normally enter the residential and commercial potable water lines from the water source and become trapped in the water delivery lines. The normal flow of water within these potable water lines generally transports the debris toward the nearest water faucet or other water pressure relief valve. Over time and in the absence of regular flushing of the potable water delivery lines, debris builds up in the water lines generally adjacent to the water faucets and valves, and eventually restricts the flow of water through the faucet or valve. This problem is especially annoying with bathtub and shower faucets, which results in decreased water pressure through the tub faucet and/or shower head, requiring additional time for the enjoyment and completion of baths and showers, inefficient bathing and rinsing, and other problems.

All water faucets, fixtures and valves are susceptible to clogging, but because of the advanced engineering in pressure balance valves, these types of valves are more susceptible to clogging than non-pressure balance valves. The water inlets in pressure balance valves are typically smaller, which make them more susceptible to clogging. One well-known pressure balance valve is the Moen® Posi-Temp® valve. In particular, the removal of debris from the potable water delivery pipes fluidically engaged with a Moen® Posi-Temp® bathtub and shower valve is especially problematic. The Moen® Posi-Temp® valve incorporates a cartridge-type operating mechanism. The Moen® cartridge-type operating mechanism and the Moen® recessed faucet housing, make the flushing of debris through the Moen® Posi-Temp® bathtub and shower valve very difficult, and may increase the potential for water damage to, and/or flooding of, the structure. Depending upon the applicable regulations of the state where the particular pressure balance valve is installed should there occur a leakage of a substantial amount of irretrievable water within the structure; there may be mandatory requirements to initiate immediate mold remediation action. Presently, when water flow becomes restricted through pressure balance valves, plumbers typically replace the cartridge without attempting to flush the lines, thereby avoiding the possibility of water leakage, mold and mildew occurrence within the structure. Unfortunately, only replacing the cartridge does not normally remove the accumulated debris from the plumbing lines and valve housing. If after several cartridges have been replaced and the water restriction remains, in the absence of using the present invention, the valve housing and/or the delivery pipe may need to be manually cleaned or replaced, thus requiring the destruction of wall tile and sheetrock, creating great expense and inconvenience to the user of the structure. In the event that a plumber or user of the structure, should attempt to flush a pressure balance valve and the adjacent water delivery pipe, the steps required are to: first turn off the water pressure to the structure from an outside main water valve, secondly open up the faucet valve within the structure and remove the operating cartridge from the valve, and then thirdly, reinstate the water pressure through the delivery pipe for perhaps, 1–3 seconds to quickly flush the pipe and valve body while attempting to limit the water leakage and/or damage within the structure. Often, this procedure must be repeated numerous times, with the end result being that the water delivery line and/or facet is still restricted with debris. The recessed housing of most pressure balance valves is typically located completely within the interior wall of the shower stall. Thus, normally when flushing these housings and adjacent water delivery lines, in the absence of using the present invention, there is no control over the amount of water or the direction of flow of the water, through these valve housings. Additionally, this type of flushing will generally result in leakage of water and debris within the interior wall space of the shower or bathtub stall, which can create mold and/or mildew within the structure. In view of the catastrophic mold and mildew insurance claims for residential and commercial structures in recent years, great caution and severe penalties have been levied against plumbers in an effort to prevent interior water leakage. Additionally, flooding from the uncontrolled flow of water through a cartridge-less pressure balance valve body onto the floor of the structure and adjacent wall areas outside the shower stall during the flushing of water and debris, can ruin sheet rock, paint, wallpaper and flooring, all resulting in expensive repairs. Moreover, the 1–3 second limited flushing of pressurized water through the water delivery lines may not be adequate to remove all of the debris within the water delivery lines and/or the faucet. Although the present invention has unlimited application for use with flushing potable water delivery pipes, residential and commercial water faucets and valves in general, it does have specific application for use in flushing the debris which collects at or near a pressure balance valve.

The present invention overcomes the drawbacks associated with the flushing of potable water delivery lines, water faucets, fixtures and other water valves, by providing a safe, reliable flush cartridge apparatus that controls the amount and direction of the flow of water, generally prevents the unwanted leakage of water within an interior wall of the structure, while providing for a long-lasting and thorough flushing of residential and commercial potable plumbing lines, faucets and valves.

Although the need for such a flush cartridge apparatus has been long felt, the prior art, heretofore, has not provided such a product which meets all of the aforementioned criterion.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features and advantages in accordance with the purpose of the invention as embodied and broadly described herein, a flush cartridge apparatus for use in the controlled removal of debris from a potable water distribution system is presented which overcomes the deficiencies of removing debris there from. The present invention provides a preferred embodiment flush cartridge apparatus generally consisting of an elongated, cylindrically shaped, hollow body having a first outer diameter, a grip portion and an internal, axial passageway having an inner diameter. The hollow body can be made of brass, copper, stainless steel, various metallic alloys, and polymers. The axial passageway extends continuously through the hollow body. The flush cartridge apparatus is preferably designed for insertion into the housing of a plumbing valve, and in particular a pressure balance valve used in the water distribution system. The flush cartridge apparatus includes a first end portion of the apparatus for initial or primary insertion into the plumbing valve housing, wherein the first end portion has an outer diameter equal to the first outer diameter of the hollow body. The first end portion of the hollow body also includes a central orifice therein to allow the escape of water and/or pressure, which would normally be created during the insertion of the hollow body into the plumbing valve housing. The hollow body also includes an elongated mid-portion. The mid-portion is attached to the first end portion, wherein the mid-portion is designed for secondary insertion into the plumbing valve housing. As the first end portion is inserted into the plumbing valve housing, the mid-portion follows directly behind the first end portion. The elongated mid-portion also includes an outer diameter equal to the first outer diameter of the hollow body. The elongated mid-portion further includes a cold water inlet port and a hot water inlet port, wherein the ports are positioned axially opposite from each other and wherein the inlet ports commence on an external surface of the outer diameter of the hollow body and terminate on an internal surface of the inner diameter of the axial passageway. The inlet ports provide a conduit for the water and debris trapped within the water distribution system to flow into the axial passageway for removal of the debris. The elongated mid-portion further includes a plurality of circumferential, radial grooves in the external surface of the hollow body for the mounting and placement of o-ring seals. The o-ring seals can be comprised of rubber and various elastomer compounds and are intended to provide a non-permeable seal between the outer surface of the hollow body and the inner diameter receiving surface of the plumbing valve housing within which the hollow body is inserted, to generally prevent water and/or debris leakage between the outer diameter of the hollow body and the inner diameter of the plumbing valve housing. A second end portion of the hollow body is affixed to the elongated mid-portion opposite of the first end portion, wherein the mid-portion is disposed between the first end portion and the second end portion. The second end portion provides an outlet for the internal, axial passageway to allow the complete discharge and removal of fluid and debris from the water distribution system. The second end portion also includes the grip portion, wherein the grip portion may include a plurality of flat surfaces designed for mechanical gripping engagement to selectively insert and selectively remove the hollow body from the plumbing valve housing of the water distribution system. The grip portion further includes an internally threaded portion for engagement with an externally threaded member. The internally threaded portion is particularly suited to engage a valve, for example a hose bib valve. With the hose bib valve attached to the grip portion, the flush cartridge provides additional control and direction for the flow of water and debris from the water distribution system. The steps for using the present invention in combination with the hose bib valve, include: disengaging the water pressure from the water distribution system, opening the plumbing valve housing, exposing and removing the operating cartridge, inserting the flush cartridge apparatus into the plumbing valve housing, engaging a keeper pin to secure the flush cartridge with the plumbing valve housing, and thereafter restoring or reengaging full water pressure to the water distribution system and flushing the debris from the water distribution system. By opening the hose bib valve and pointing the discharge port of the hose bib toward the direction of the bathtub or shower drain, the flush cartridge can then provide a long, sustained and complete flushing of the debris from within the water distribution system in the absence of water leakage, in the absence of creating mold or mildew within the structure, and in the absence of damaging sheetrock, paint, wallpaper or flooring of the structure.

It is an object of the present invention to provide a flush cartridge apparatus for use in the controlled removal of debris from a water distribution system.

Another object of the present invention is to provide a flush cartridge apparatus for sealing engagement with a plumbing valve housing for the removal of debris from the water distribution system while controlling the direction and amount of flow from the water distribution system.

Yet another object of the present invention is to provide a flush cartridge apparatus for simultaneously flushing debris out of the hot water and cold-water plumbing lines.

Still another object of the present invention is to provide a flush cartridge apparatus for sealing engagement with various types of plumbing valve housings, including pressure balance valves and mixing valves for the removal of debris from the water distribution system while controlling the direction and amount of flow from the water distribution system.

Another object of the present invention is to provide a flush cartridge apparatus to remove accumulated debris from the water delivery pipe that causes damage to expensive operating cartridges used in pressure balance valves.

Yet another object of the present invention is to provide a flush cartridge apparatus, which can be used with other devices to reverse flow on the water delivery lines to back flush the water delivery lines.

Still another object of the present invention is to provide a flush cartridge apparatus which caps off the bathtub drop spout and shower riser to provide maximum water pressure to remove debris from the water delivery lines and plumbing valves.

Another object of the present invention is to provide a flush cartridge apparatus which completely flushes the debris from the water delivery lines and plumbing valve housing without the need for removing sheetrock, tile, etc. to gain full access to the area where the water delivery lines connect with the plumbing valve.

BRIEF DESCRIPTION OF THE DRAWINGS

The accompanying drawings which are incorporated into and constitute a part of this specification, illustrate a preferred embodiment of the invention and together with a general description of the invention given above and the detailed description of the preferred embodiment given below serve to explain the principals of the invention.

DETAILED DESCRIPTION OF THE INVENTION

Figure 1:
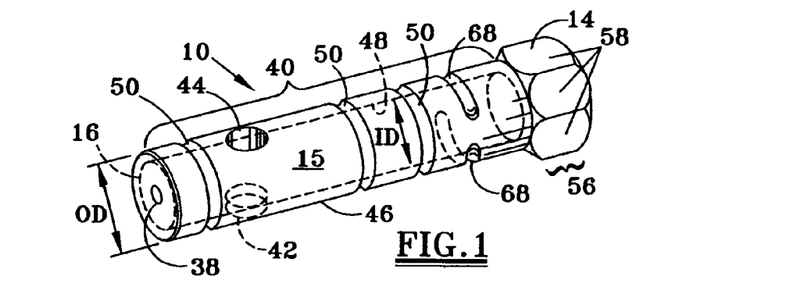
FIG. 1 is a first perspective view of a flush cartridge apparatus, illustrating the preferred embodiment of the present invention.
Figures 2, 3:
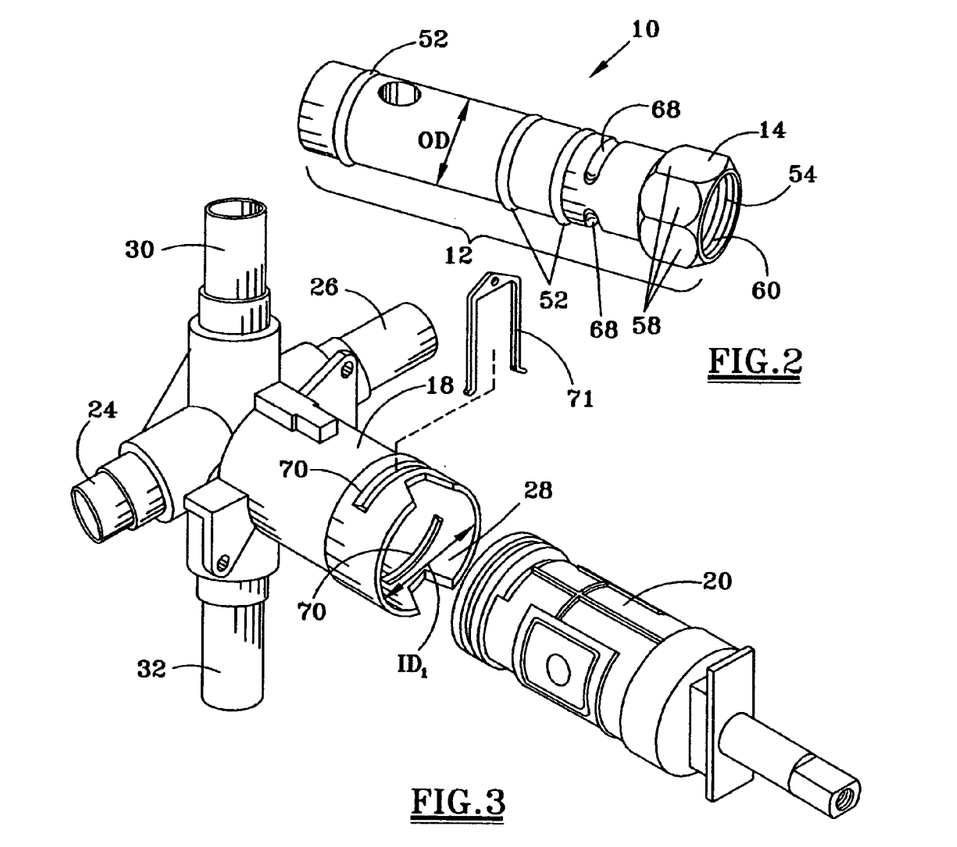
FIG. 2 is a second perspective view of a flush cartridge apparatus illustrating the preferred embodiment of the present invention.
FIG. 3 is a perspective, exploded view of a plumbing valve housing and the operating cartridge used in the plumbing valve housing to control the flow of hot and cold water through the plumbing valve.
Figure 4:
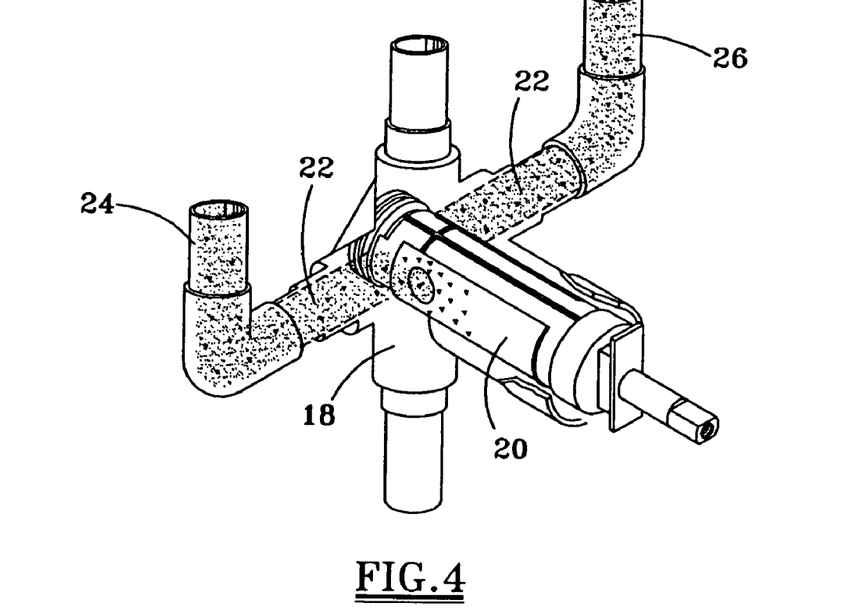
FIG. 4 is a perspective, operational view of the plumbing valve and operating cartridge illustrated in FIG. 3, illustrating engagement to hot water delivery pipe and cold water delivery pipe, further illustrating the accumulation of debris inside the water delivery pipe and inside the plumbing valve housing.

With reference to the drawings wherein like parts are designated by like numerals, FIGS. 1–2 illustrate various views of the preferred embodiment flush cartridge apparatus 10 for use in the controlled removal of debris from a water distribution system. The flush cartridge apparatus 10 preferably includes an elongated, cylindrically shaped, hollow body 12. The hollow body 12 may preferably be constructed of brass, copper, stainless steel, various metallic alloys, and/or polymers. The hollow body 12 includes a first outer diameter OD, a grip portion 14 and an internal, axial passageway 15 having an inner diameter 1D. The axial passageway 15 extends continuously through the hollow body 12 and grip portion 14. In FIG. 3, a plumbing valve housing 18 and an operating cartridge 20 for use with the plumbing valve housing 18, are illustrated. Although the specific plumbing valve housing 18 shown in FIG. 3 is a pressure balance valve 18, the present invention 10 is adaptable for use with all types of potable water plumbing valves, for example, including a mixing valve (not shown). The pressure balance valve housing 18 and the operating cartridge 20 may both be generally used in a water distribution system. The flush cartridge apparatus 10 is preferably designed for insertion into the plumbing valve housing 18, in place of the operating cartridge 20, for use in flushing debris from the water distribution system. As depicted in FIG. 4, various types of debris 22 including, for example, solder, PVC glue, sand, silt, dirt, rock particles, wood shavings, saw dust, copper shavings and other debris can become trapped within the water distribution system, especially in a hot water supply plumbing line 24 and a cold water supply plumbing line 26 at or near where the supply lines 24, 26 engage the plumbing valve housing 18. As further depicted, debris 22 can also accumulate inside the plumbing valve housing 18 at, and adjacent to, the cartridge 20. Normally, the homeowner or user of the residential or commercial water distribution system will not know the extent of the debris 22 accumulation within the plumbing valve housing 18, however the user is likely to notice, prolonged, restricted water flow through the plumbing valve housing 18 which should alert the user that there is a possibility that the restricted water flow may be due in part to an accumulation of debris 22 in the water delivery lines 24, 26 and/or plumbing valve housing 18.

Figures 6, 7:
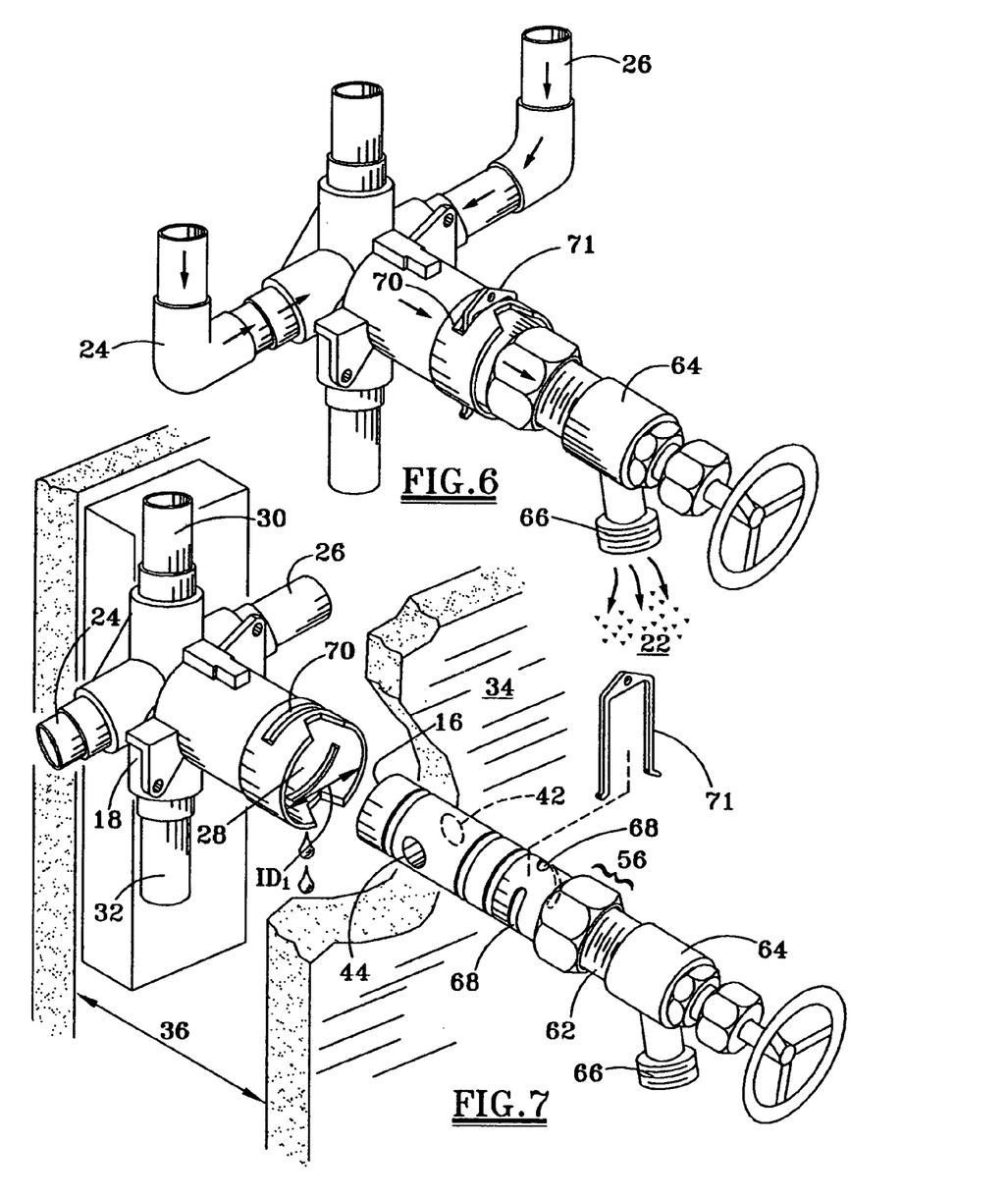
FIG. 6 is a perspective, operational view of a preferred embodiment flush cartridge apparatus illustrated in operational engagement with the plumbing valve housing and a water control valve, wherein water and debris flow is depicted flowing through the flush cartridge apparatus and out of the water control valve.
FIG. 7 is a partially cut-away view of a cartridge-less plumbing valve housing located within a shower or tub stall wall, illustrating water leakage within the shower or tub stall wall and the present invention flush cartridge apparatus in combination with a water control valve illustrating a preferred method of directing the flow of water and debris from the water distribution system.

The water delivery lines 24, 26 a plumber or the homeowner must first close a main water valve (not shown) that permits water flow from the water source (not shown) into the structure (not shown). After the main water valve (not shown) has been closed, the water pressure within the water distribution system has become disengaged and there should not be any water pressure present in the delivery lines 24, 26. The tub or shower trim wall face plate and operating handle (not shown) which is generally engaged to the plumbing valve housing 18, is then disassembled and removed, generally revealing an exposed operating cartridge 20, as shown in FIG. 4. The operating cartridge 20 is then removed as shown in FIG. 3, further exposing a cylindrically shaped, housing opening 28 in the plumbing valve housing 18. With the main water valve (not shown) closed, there should not be any water flowing through the delivery lines 24, 26 to flush the debris 22 out of the delivery lines 24, 26 and housing opening 28. As shown in FIG. 7, the plumbing valve housing 18, the housing opening 28, the delivery lines 24, 26, and a shower riser 30 and tub spout drop 32 are all typically located behind the sheetrock wall 34 and within the shower/tub stall wall space 36. Should the water pressure be restored to the cartridge-less plumbing valve housing 18, as shown in FIG. 7, in an effort to remove the debris 22 from the delivery lines 24, 26 and plumbing valve housing 18, water would normally leak into the wall space 36, and would otherwise spray uncontrollably from the housing opening 28, thereby damaging the surrounding sheetrock wall 34, paint, wallpaper and flooring (not shown). The benefit of the removing debris 22 using the above-described method, is greatly outweighed by the resulting water damage to the structure, the likelihood of creating mold and/or mildew as a result of the water leak, and the cost and inconvenience of mold and mildew remediation to the owner of the structure.

Figure 5:
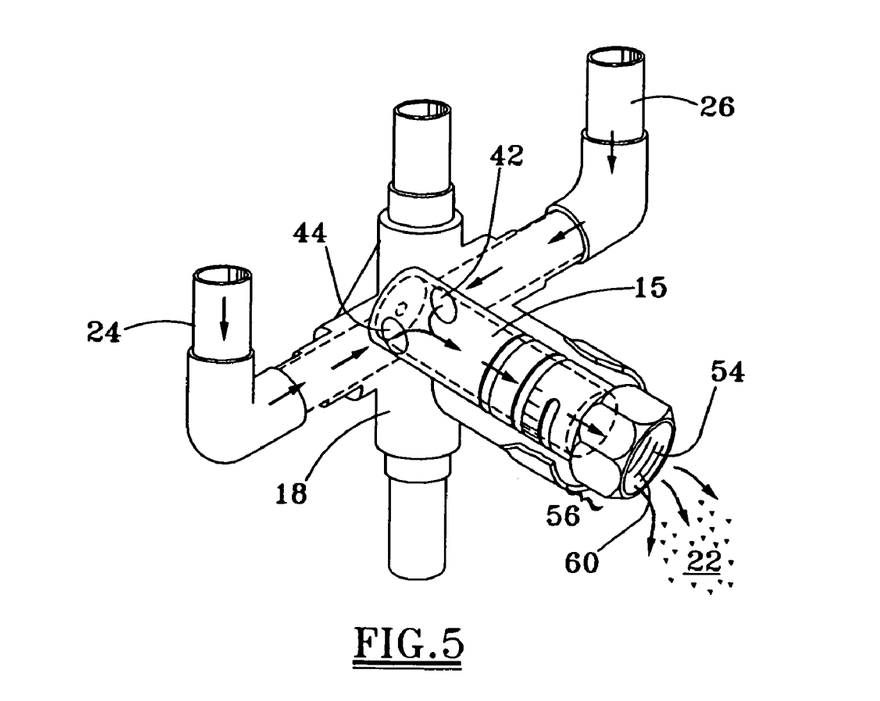
FIG. 5 is a partially cut-away, perspective, operational view of a preferred embodiment flush cartridge apparatus in operational engagement with the plumbing valve housing, further illustrating the flow of water and debris from the water distribution system through the flush cartridge apparatus.
Figure 8:
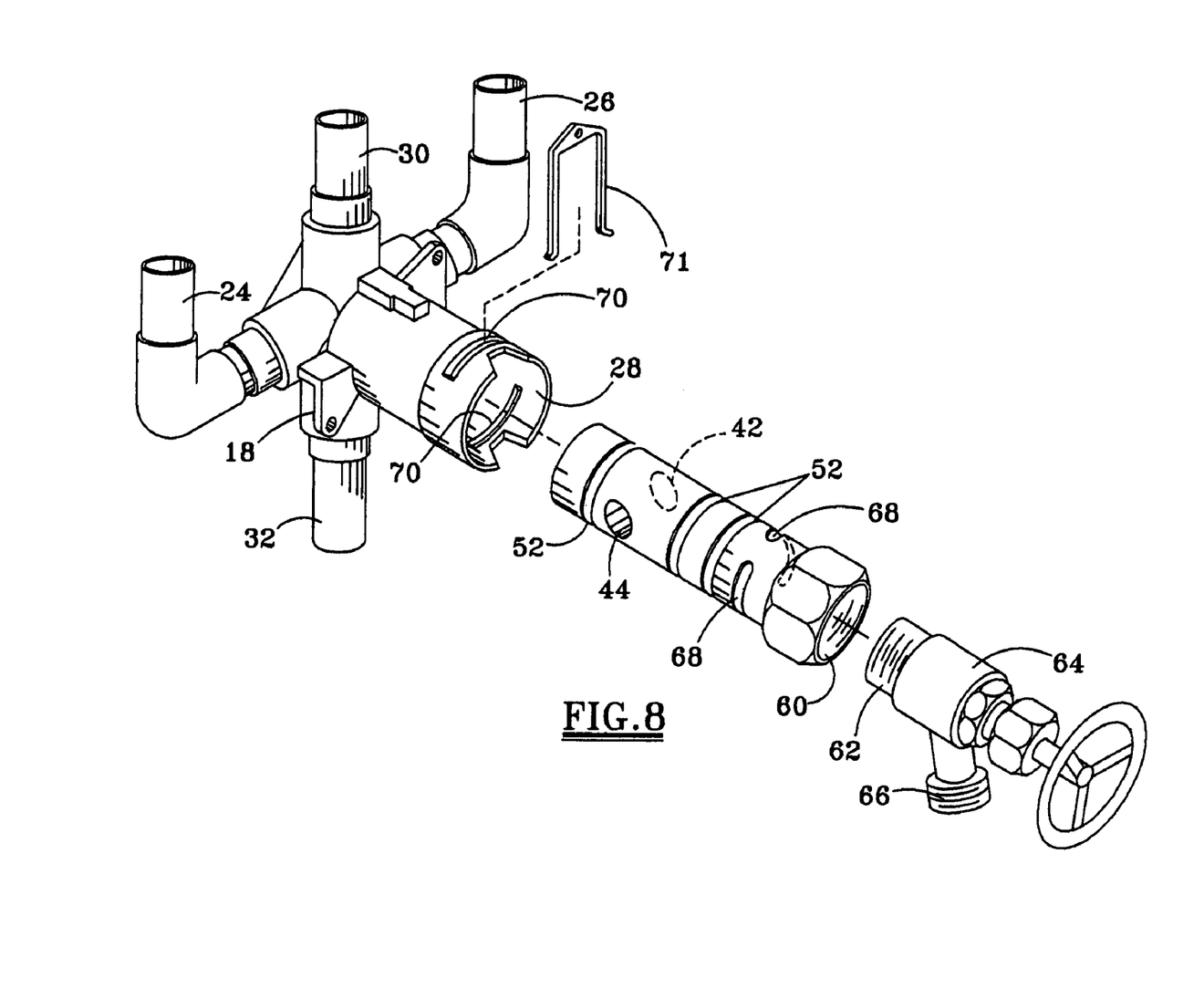
FIG. 8 is an exploded, perspective view of the present invention flush cartridge apparatus illustrated in perspective alignment with a cartridge-less plumbing valve housing and a water control valve.

As shown in FIGS. 5 and 7–8, the preferred embodiment flush cartridge apparatus 10 is designed to remove of debris 22 from the cartridge-less plumbing valve housing 18, the housing opening 28, and the water delivery lines 24, 26. A first end portion 16 of the cylindrically shaped hollow body 12 is inserted into the housing opening 28. The first end portion 16 includes an outer diameter OD equal to the first outer diameter OD of the hollow body 12. The OD is just slightly smaller than an inner diameter, receiving surface $ID_1$ of the housing opening 28. Thus, as the first end portion 16 is inserted into the housing opening 28, a snug fit is formed between the OD of the cylindrically shaped hollow body 12 and the inner diameter, receiving surface $ID_1$ of the housing opening 28. The first end portion 16 of the hollow body 12 also includes a central orifice 38 therein to allow the escape of water and/or water pressure, during the insertion of the hollow body 12 into the housing opening 28.

The cylindrically shaped hollow body 12 also includes an elongated, mid-portion 40. The mid-portion 40 is attached to the first end portion 16, wherein the mid-portion 40 is designed for secondary insertion into the housing opening 28, immediately following the insertion of the first end portion 16. The elongated mid-portion 40 generally has an outer diameter OD equal to the first outer diameter OD of the hollow body 12. The elongated mid-portion 40 further includes a cold water inlet port 42 and a hot water inlet port 44, wherein the ports 42, 44 are positioned axially opposite from each other and wherein the inlet ports 42, 44 both commence on an external surface 46 of the outer diameter OD of the hollow body 12 and terminate on an internal surface 48 of the inner diameter ID of the axial passageway 15. The inlet ports 42, 44 provide a conduit for the water and debris 22 trapped in the water delivery lines 24, 26 to be flushed into the axial passageway 15 and removed from the water distribution system. The elongated mid-portion 40 further includes a plurality of circumferential, radial grooves 50, as depicted in FIG. 1, in the external surface 46 of the hollow body 12, wherein each groove 50 is designed for the mounting and placement of an o-ring seal 52. The o-ring seals 52, as shown in FIG. 2, are intended to generally provide a non-permeable seal connection between the outer surface 46 of the hollow body 12 and the inner diameter receiving surface $ID_1$ of the housing opening 28, to generally prevent water and/or debris 22 leakage between the hollow body 12 and the housing opening 28 when the flush cartridge apparatus 10 is in operative engagement with the plumbing valve housing 18. When the preferred embodiment flush cartridge apparatus 10 is fully inserted into the plumbing valve housing 18, as depicted in FIG. 5, water and debris 22 flow into the inlet ports 42, 44 and through an outlet 54 in the axial passageway 15, in a controlled manner and generally in the absence of leaking or flooding water and/or debris 22 within the structure. A second end portion 56 of the hollow body 12 is affixed to the elongated mid-portion 40, wherein the mid-portion 40 is disposed between the first end portion 16 and the second end portion 56. The second end portion 56 actually houses the outlet 54 of the internal, axial passageway 15 to facilitate the complete discharge of fluid and debris 22 from the water distribution system. The second end portion 56 also includes the grip portion 14, wherein the grip portion 14 may include a plurality of flat external surfaces 58 designed for manual and/or mechanical gripping engagement to selectively insert and selectively remove the hollow body 12 from the plumbing valve housing 18 of the water distribution system. The second end portion 56 further includes an internally threaded portion 60, having a standard mechanical, female-type thread for threaded engagement with a male-type threaded portion 62 of a valve 64 or garden hose (not shown). The internally threaded portion 60 is particularly suited to engage, for example, a standard hose bib type water valve 64. With the hose bib valve 64 threadedly engaged to the internally threaded portion 60 of the hollow body 12, the flush cartridge apparatus 10 can be fully inserted into the housing opening 28, as shown in FIGS. 6–7, and thereafter the full water pressure can be restored to the water distribution system and controlled by the selective opening or closing of the hose bib valve 64. With the flush cartridge apparatus 10 in operative engagement with the plumbing valve housing 18 and the hose bib valve 64, thereafter restoring the water pressure to the water distribution system and opening the hose bib valve 64 and pointing a discharge port 66 of the hose bib valve 64 directly into the bathtub or shower drain (not shown), the flush cartridge apparatus 10 can then provide a long, sustained and complete flushing of the debris 22 from within the water distribution system in the absence of water leakage within the structure thus minimizing the occurrence of mold and/or mildew, and in the absence of damaging sheetrock 34, paint, wallpaper or flooring of the structure. For example, the amount of time available for completely and effectively flushing debris 22 from the plumbing valve housing 18 and the adjacent water delivery lines 24, 26 using the present invention flush cartridge apparatus 10, generally in the absence of leaking water within the structure and otherwise avoiding the type of damage normally associated with flushing debris 22 from a water distribution system, is limitless.

OPERATION

As depicted in FIGS. 5–8, the present invention flush cartridge apparatus 10 is designed to sealably fit within the housing opening 28 of a plumbing valve housing 18, either in combination with an additional valve 64 or without the valve 64. As depicted in FIG. 5, the second end portion 56 of the hollow body 12, may provide enough outward extension past the sheetrock wall 34, or alternatively by attaching a ½ inch nipple (not shown) to the internally threaded portion 60, to provide for a long, sustained and complete flushing of the water delivery lines 24, 26 and plumbing valve housing 18 in the absence of leaking water and debris 22 within the tub/shower wall space 36 or elsewhere within the structure. Where the flow of water and debris 22 through the outlet 54 can be effectively contained within a shower stall and/or bathtub area (not shown), there is no need to include the additional valve 64 or nipple (not shown).

However, where the plumbing valve housing 18 and/or housing opening 28 does not protrude past the sheetrock wall 34 and into the shower stall and/or bathtub area (not shown) and/or there is no effective way of containing water and debris 22 being flushed out of the outlet 54, the use of a valve 64 to direct the water and debris 22 flow into the shower or tub drain (not shown), or the use of a garden hose (not shown) having a male-type, threaded end for threaded engagement to the internal female-type threads 60 of the second end portion 56 to carry the water and debris 22 to the shower or tub drain, or alternatively, outside the structure, would be of significant advantage.

An additional operating feature of the present invention flush cartridge apparatus 10 is the inclusion of at least one partial-circumferential notch 68 in the external surface 46 of the hollow body 12 for locking alignment with a reciprocal partial-circumferential notch 70 in the plumbing valve housing 18. As shown in FIG. 7, the notch 68 of the hollow body 12 does not align in parallel alignment with the reciprocal notch 70, but rather notch 68 aligns perpendicularly with notch 70 to allow a keeper pin 71 to engage both notches 68, 70 simultaneously. As shown in FIG. 8, by inserting the flush cartridge apparatus 10 into the housing opening 28 with perpendicular alignment between the notch 68 and the reciprocal notch 70, the keeper pin 71 can be engaged within the notch 68 and the reciprocal notch 70 to generally prevent the unintended removal of the flush cartridge 10. The perpendicular alignment between the notch 68 and the reciprocal notch 70 and inclusion of the keeper pin 71, is a helpful safety feature of the present invention since it is possible that the flush cartridge apparatus 10 could become dislodged from the plumbing valve housing 18 when the water pressure is restored to the water distribution system, should the keeper pin 71 not be used with notch 68 and reciprocal notch 70.

Additionally, the present invention flush cartridge apparatus 10 can be used with a pressure balance valve-type plumbing valve housing 18 to back flush the water distribution system. Where the flush cartridge apparatus 10 is engaged to the plumbing valve housing 18 and the main water valve (not shown) is shut off, a source of compressed gas (not shown) such as, for example, compressed nitrogen or compressed air can be communicably engaged to the internally threaded portion 60 of the flush cartridge apparatus 10. Thereafter, by opening a second valve in the water distribution system, for example a kitchen sink water valve or an outside garden hose bib (not shown) located some distance away from the flush cartridge apparatus 10 and allowing the compressed gas to enter and flow freely through the water distribution system, the flow is reversed through water distribution system, thereby removing trapped debris 22 from most, if not all, of the piping, valves, etc. of the water distribution system. Using this procedure, the debris 22 would normally egress through the second valve (not shown) in the water distribution system. Presently, there is no other known tool or method that provides the advantages and fills the long-felt, but as of yet unfulfilled, need as compared to the present invention flush cartridge apparatus 10.

It will be appreciated that these and other embodiments may be provided for the controlled and safe flushing of debris from potable water delivery lines, water faucets and other water valves. Additional embodiments become readily apparent in view of the present invention as described herein above. Having described the invention above various modifications of the techniques, procedures and materials will be apparent to those skilled in the art. It is intended that all such variations within the scope and spirit of the appended claims be embraced thereby.

What is claimed is:

1. A flush cartridge apparatus for use in the removal of debris from a potable water distribution system, comprising:
    an elongated, cylindrically shaped, hollow body having a first outer diameter and an axial passageway having an inner diameter;
    a first end portion of said cylindrically shaped, hollow body being designed for primary insertion into a housing opening in a plumbing valve housing used in a potable water distribution system, said first end portion having an outer diameter equal to the first outer diameter of the hollow body and further having a central orifice therein;
    an elongated mid-portion of said cylindrically shaped, hollow body being designed for secondary insertion into the housing opening, said elongated mid-portion being affixed to said first end portion and having an outer diameter equal to the first outer diameter of the cylindrically shaped, hollow body, said mid-portion further having a cold water inlet port and a hot water inlet port, said inlet ports being positioned axially disposed from one another in said mid-portion, wherein the inlet ports provide fluid and debris flow from the potable water distribution system in to the internal, axial passageway, said mid-portion further having a plurality of circumferential, radial grooves in an external surface of said cylindrically shaped hollow body, wherein each of said circumferential, radial grooves are adapted for the mounting of an o-ring seal member therein for sealing engagement of said cylindrically shaped hollow body within an inner diameter receiving surface of the plumbing valve housing to generally prevent fluid and debris flow between the outer diameter of the cylindrically shaped hollow body and the inner diameter receiving surface of the housing opening; and
    a second end portion of said cylindrically shaped hollow body being affixed to said elongated mid-portion and wherein the mid-portion is disposed between the first end portion and the second end portion, said second end portion providing an outlet for said internal, axial passageway to allow the complete discharge of debris from the potable water distribution system.

2. The flush cartridge apparatus for use in the removal of debris from a potable water distribution system, as defined in claim 1, wherein the second end portion further includes a grip portion.

3. The flush cartridge apparatus for use in the removal of debris from a potable water distribution system, as defined in claim 2, wherein the grip portion includes gripping means thereon for gripping engagement to selectively insert and selectively remove said cylindrically shaped hollow body from the plumbing valve housing.

4. The flush cartridge apparatus for use in the removal of debris from a potable water distribution system, as defined in claim 1, wherein the cylindrically shaped hollow body further comprises at least one partial-circumferential notch for locking alignment with a reciprocal notch in the plumbing valve housing.

5. The flush cartridge apparatus for use in the removal of debris from a potable water distribution system, as defined in claim 4, wherein a keeper pin is used to simultaneously engage the at least one partial-circumferential notch in the cylindrically shaped hollow body with the reciprocal notch in the plumbing valve housing to securely retain the cylindrically shaped hollow body within the inner diameter receiving surface of the plumbing valve housing.

6. The flush cartridge apparatus for use in the removal of debris from a potable water distribution system, as defined in claim 5, wherein the operational engagement of the inlet ports of the mid-portion of the cylindrically shaped hollow body being in fluidic communication with one or more potable water delivery lines engaged to the plumbing valve housing, allows for maximum water pressure from an outside water source to flow through the potable water distribution system and out of the outlet of the cylindrically shaped hollow body to provide a lengthy, thorough and simultaneous flushing of debris from the plumbing valve housing and the one or more water delivery lines in fluidic communication with the plumbing valve housing, generally in the absence of leaking water between the outer surface of the cylindrically-shaped hollow body and an inner diameter receiving surface of the plumbing valve housing.

7. The flush cartridge apparatus for use in the removal of debris from a potable water distribution system, as defined in claim 6, wherein the second end portion of said flush cartridge apparatus further comprises an internal threaded portion for threaded engagement with a valve member to selectively open and selectively close the flow of water and debris from the outlet of said internal axial passageway, said valve member providing an axial extension of the internal axial passageway to generally prevent the unintended leakage of water and debris from the internal axial passageway within a structure.

8. A flush cartridge apparatus for use in the removal of debris from a potable water distribution system, comprising:
  an elongated, cylindrically shaped hollow body having a first outer diameter, a grip portion and an internal, axial passageway;
  a first end portion of said cylindrically shaped hollow body being designed for primary insertion into a housing opening in a plumbing valve housing used in the water distribution system, said first end portion having an outer diameter equal to the first outer diameter of the hollow body and further having a central orifice therein for relieving the pressure build-up created by the insertion of said first end of said hollow body into the plumbing valve housing;
  an elongated mid-portion of said cylindrically shaped hollow body being designed for secondary insertion into the plumbing valve housing opening, said elongated mid-portion being affixed to said first end portion and having an outer diameter equal to the first outer diameter of the cylindrically shaped hollow body, said mid-portion further having a cold water inlet port and a hot water inlet port, said inlet ports being positioned axially disposed from one another in said mid-portion, wherein each of said inlet ports commence on an external surface of the outer diameter of said hollow body and terminate on an internal surface of the axial passageway, wherein the inlet ports provide fluid and debris flow from the water distribution system in to the internal, axial passageway, said mid-portion further having a plurality of circumferential, radial grooves in the external surface of said hollow body, wherein each of said circumferential, radial grooves being adapted for the mounting of an o-ring seal member therein for sealing engagement of said cylindrically shaped hollow body within an inner diameter receiving surface of the plumbing valve housing opening to generally prevent fluid and debris flow between the outer diameter of the hollow body and the inner diameter receiving surface of the housing opening; and
  a second end portion of said cylindrically shaped hollow body being affixed to said elongated mid-portion, wherein the mid-portion is disposed between the first end portion and the second end portion, said second end portion providing an outlet for said internal, axial passageway to allow the complete discharge of debris from the water distribution system, said second end portion further including the grip portion, wherein the grip portion includes gripping means thereon for mechanical gripping engagement to selectively insert and selectively remove said cylindrically shaped hollow body from the plumbing valve housing opening.

9. The flush cartridge apparatus for use in the removal of debris from a potable water distribution system, as defined in claim 8, wherein the grip portion of said flush cartridge apparatus further comprises a plurality of flat, external surfaces for mechanical gripping engagement with a tool.

10. The flush cartridge apparatus for use in the removal of debris from a potable water distribution system, as defined in claim 9, wherein the grip portion of said flush cartridge apparatus further comprises a plurality of flat, external surfaces for mechanical gripping engagement with a wrench.

11. The flush cartridge apparatus for use in the removal of debris from a potable water distribution system, as defined in claim 10, wherein the second end portion of said flush cartridge apparatus further comprises an internal threaded portion for engagement with an external threaded member.

12. The flush cartridge apparatus for use in the removal of debris from a potable water distribution system, as defined in claim 11, wherein the internal threaded portion of the second end portion engages a valve member to selectively open and selectively close the flow of water and debris from the outlet of said internal axial passageway.

13. The flush cartridge apparatus for use in the removal of debris from a potable water distribution system, as defined in claim 12, wherein the valve member provides axial extension of the internal axial passageway to generally prevent the unintended leakage of water and debris from the internal axial passageway within a structure.

14. The flush cartridge apparatus for use in the removal of debris from a potable water distribution system, as defined in claim 13, wherein an outer surface of said elongated mid-portion of the cylindrically shaped hollow body includes at least one partial-circumferential notch for mating and locking alignment with at least one reciprocal notch in a plumbing valve housing, wherein a keeper pin engages the at least one partial-circumferential notch and the at least one reciprocal notch, to securely retain the cylindrically shaped hollow body with the plumbing valve housing.

15. The flush cartridge apparatus for use in the removal of debris from a potable water distribution system, as defined in claim 14, wherein the operational engagement of the inlet ports of the mid-portion of the cylindrically shaped hollow body in fluidic communication with one or more water delivery lines engaged to the plumbing valve housing allows for maximum water pressure from an outside water source to flow through the potable water distribution system and out of the outlet of the cylindrically shaped hollow body to provide a lengthy, thorough, and simultaneous flushing of debris from the plumbing valve housing and one or more water delivery lines in fluidic communication with the plumbing valve housing, generally in the absence of leaking water between the outer surface of the cylindrically shaped hollow body and an inner diameter receiving surface of the plumbing valve housing.

16. A flush cartridge apparatus for use in the removal of debris from a water distribution system, comprising:
- an elongated, cylindrically shaped hollow body, said cylindrically shaped hollow body generally having a cylindrical, outer surface defined by a first outer diameter, said outer surface having a first outer diameter and further comprising at least one partial circumferential notch therein for locking alignment with a reciprocal notch in a pressure balance valve housing;
- a keeper pin, wherein said keeper pin simultaneously engages the at least one partial-circumferential notch in the cylindrically shaped hollow body and the reciprocal notch in the pressure balance valve housing to securely retain the cylindrically shaped hollow body within an inner diameter receiving surface of the pressure balance valve housing,
- an internal, axial passageway being continuously axially disposed through said cylindrically shaped hollow body, the axial passageway having an inner diameter;
- a first end portion of said cylindrically-shaped, hollow body being affixed at a first end of said cylindrically shaped hollow body, said first end portion being designed for primary insertion into a housing opening of the pressure balance valve used in the water distribution system, said first end portion having an outer diameter equal to the first outer diameter of the cylindrically shaped hollow body and further having a central orifice therein for relieving the pressure build-up created by the insertion of said first end of said cylindrically shaped hollow body into the housing opening;
- an elongated mid-portion of said cylindrically shaped hollow body being designed for secondary insertion into the housing opening, said elongated mid-portion being affixed to said first end portion and having an outer diameter equal to the first outer diameter of the hollow body of said cylindrically shaped hollow body, said mid-portion further having a cold water inlet port and a hot water inlet port, said inlet ports being positioned axially disposed from one another in said mid-portion, wherein each of said inlet ports commence on the outer surface of said cylindrically shaped hollow body and terminate on an internal surface of the inner diameter of the axial passageway, wherein the inlet ports provide fluidic and debris flow communication from a hot water conduit and a cold water conduit, wherein both conduits are fluidically engaged to the pressure balance valve housing, said mid-portion further having a plurality of circumferential grooves in the external surface of said cylindrically shaped hollow body, wherein each of said circumferential grooves are adapted for the mounting of an o-ring seal member therein for sealing engagement of said cylindrically shaped hollow body within the housing of the pressure balance valve to generally prevent fluid and debris flow between the outer diameter of the hollow body and the inner diameter receiving surface of the pressure balance valve housing; and
- a second end portion of said cylindrically-shaped, hollow body being affixed to said elongated mid-portion and wherein the mid-portion is disposed between the first end portion and the second end portion, said second end portion providing an outlet for said internal, axial passageway to allow the complete discharge of debris from the water distribution system, said second end portion further including a grip portion, the second end portion also having an internally threaded portion for engagement with an external threaded member and the grip portion having a plurality of flat external surfaces thereon for mechanical gripping engagement to selectively insert and selectively remove said cylindrically-shaped hollow body from the pressure balance valve.

17. A flush cartridge apparatus for use in the removal of debris from a water distribution system, comprising:
- an elongated, cylindrically shaped, hollow body, said hollow body generally having a cylindrical, outer surface defined by a first outer diameter, said outer surface further comprising at least one partial circumferential notch therein for locking alignment with a reciprocal notch in a pressure balance valve housing;
- a keeper pin, wherein said keeper pin simultaneously engages the at least one partial-circumferential notch in the cylindrically shaped hollow body and the reciprocal notch in the pressure balance valve housing to securely retain the cylindrically shaped hollow body within an inner diameter receiving surface of the pressure balance valve housing;
- an internal, axial passageway being axially disposed through said cylindrically shaped hollow body, the axial passageway having an inner diameter;
- a first end portion of said cylindrically shaped, hollow body being affixed at a first end of said hollow body, said first end portion being designed for primary insertion into a housing opening of the pressure balance valve used in the water distribution system, said first end portion having an outer diameter equal to the first outer diameter of the hollow body and further having a central orifice therein for relieving the pressure build-up created by the insertion of said first end of said hollow body into the housing opening of the pressure balance valve;
- an elongated mid-portion of said cylindrically shaped, hollow body being designed for secondary insertion into the housing opening of the pressure balance valve, said elongated mid-portion being affixed to said first end portion and having an outer diameter equal to the first outer diameter of the hollow body of said cylindrically shaped, hollow body, said mid-portion further having a cold water inlet port and a hot water inlet port, said inlet ports being positioned axially disposed from one another in said mid-portion, wherein each of said inlet ports commence on an external surface of the outer surface of said hollow body and terminate on an internal surface of the inner diameter of the axial passageway, wherein the inlet ports provide fluidic and debris flow from a hot water conduit and a cold water conduit, wherein both conduits are fluidically engaged to the pressure balance valve, said mid-portion further having a plurality of circumferential grooves in the external surface of said hollow body, wherein each of said circumferential grooves is adapted for the mounting of an o-ring seal member therein for sealing engagement of said hollow body within the housing of the pressure balance valve to generally prevent fluid and debris flow between the outer diameter of the hollow body and the inner diameter receiving surface of the pressure balance valve;
- a second end portion of said cylindrically shaped, hollow body being affixed to said elongated mid-portion and wherein the mid-portion is disposed between the first end portion and the second end portion, said second end portion providing an outlet for said internal, axial passageway to allow the complete discharge of debris from the water distribution system, said second end portion further including a grip portion, the second end portion also having an internally threaded portion for engagement with an external threaded member and the grip portion having a plurality of flat external surfaces thereon for mechanical gripping engagement to selectively insert and selectively remove said cylindrically shaped hollow body from the pressure balance valve; and a valve member having external threads for threaded engagement with the internally threaded portion of the second end portion, said valve member having means to selectively open and selectively close the flow of water and debris from the outlet of said internal axial passageway, said valve member further providing axial extension of the internal axial passageway to generally prevent the unintended leakage of water and debris from the internal axial passageway within a structure.

18. The flush cartridge apparatus for use in the removal of debris from a potable water distribution system, as defined in claim 17, wherein the operational engagement of the inlet ports of the mid-portion of the cylindrically shaped hollow body being in fluidic communication with one or more water delivery lines engaged to the pressure balance valve allows for maximum water pressure from an outside water source to flow through the potable water distribution system and out of the outlet of the hollow body to provide a lengthy, thorough, and simultaneous flushing of debris from the pressure balance valve and one or more water delivery lines in fluidic communication with the pressure balance valve, generally in the absence of leaking water between the outer surface of the cylindrically shaped hollow body and an inner diameter receiving surface of the pressure balance valve.

19. The flush cartridge apparatus for use in the removal of debris from a potable water distribution system, as defined in claim 18, wherein the cylindrically shaped hollow body is comprised of brass.

20. A method of using a flush cartridge apparatus for use in the removal of debris from a potable water distribution system in a commercial or residential structure, comprising the steps of disengaging the water pressure from the water distribution system;

opening a plumbing valve housing used in the water distribution system, to expose an operating cartridge;

removing the operating cartridge from the plumbing valve housing;

inserting the flush cartridge into the plumbing valve housing;

engaging a keeper pin in locking alignment with the flush cartridge and the plumbing valve housing;

forming a non-permeable seal between the flush cartridge and an inner diameter receiving surface of the plumbing valve housing;

engaging the water pressure to the water distribution system; and flushing the debris from one or more water delivery lines and the plumbing valve housing through an outlet of the flush cartridge.

* * * * *